Patented July 1, 1952

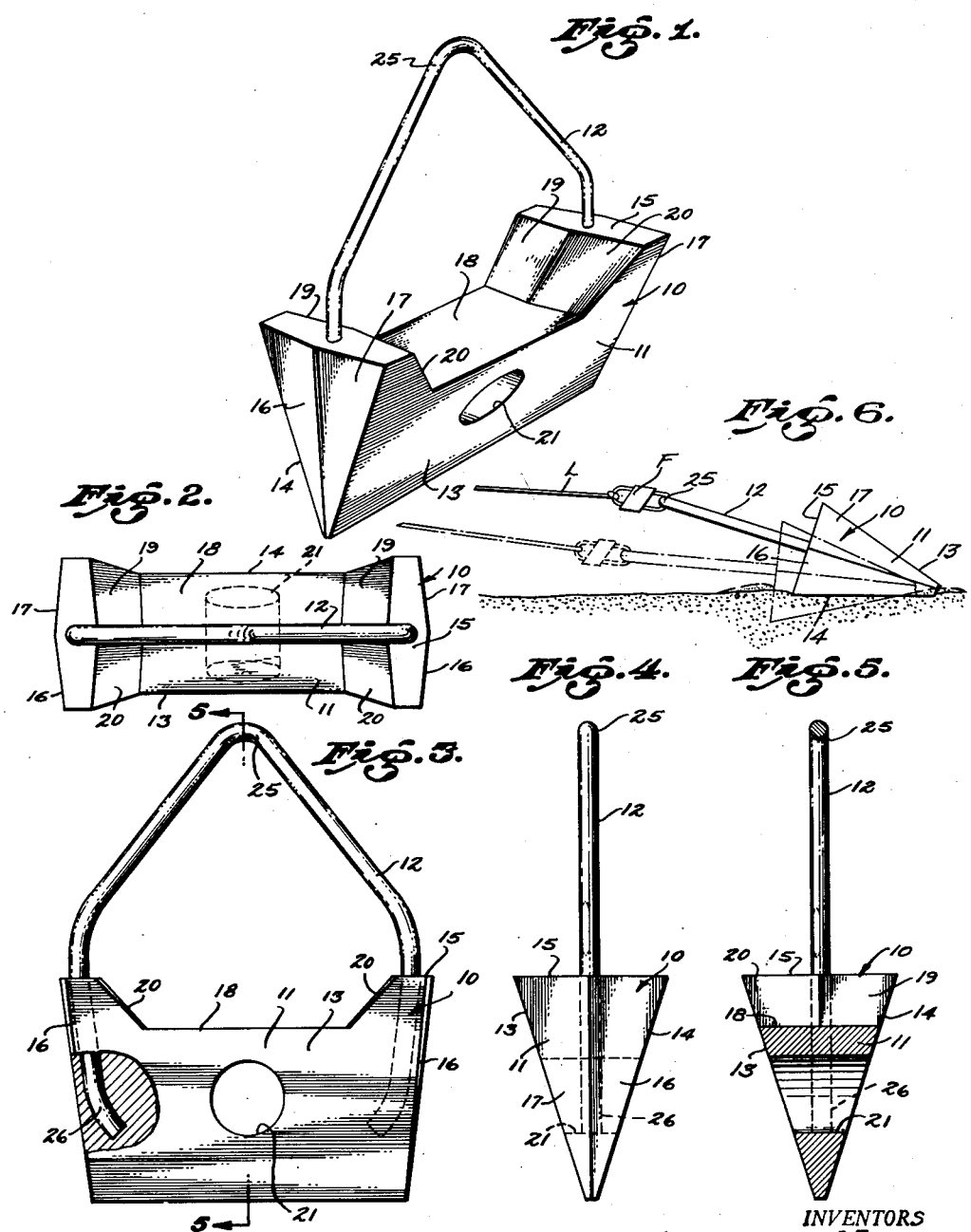

2,601,737

UNITED STATES PATENT OFFICE 2,601,737

FISHLINE SINKER

Ambrose Neja and Lawrence Weber, Anaheim, Calif.

Application September 12, 1949, Serial No. 115,212

1 Claim. (Cl. 43—44.96)

This invention relates to a combination sinker and anchor for fishing lines and more particularly to a sinker so constructed as to cause it to sink rapidly into the water and, when on the bottom, dig into the bottom, thus holding the fishing line in place.

Heretofore sinkers used in fishing have been so constructed that when used in an ocean or other moving water situations they would more or less tumble or roll with the current thus moving the fishing line along with them.

Therefore it is a main object of this invention to provide a combination fish line sinker and anchor so constructed and shaped as to enable it to dig in and hold when on the bottom of a body of water.

It is another object of this invention to provide a combination fish line, sinker and anchor that will descend rapidly in the water and when on the bottom remain in relatively a fixed position and not be tumbled or rolled by water currents.

Other and further important objects and advantages of the invention will become apparent from the disclosures in the following specification, appended claim and accompanying drawings, wherein:

Fig. 1 is a perspective view of our combination fish line, sinker and anchor;

Fig. 2 is a top plan view of our invention;

Fig. 3 is a front elevational view;

Fig. 4 is a side elevational view;

Fig. 5 is a view taken substantially as indicated by line 5—5, Fig. 3, and

Fig. 6 is a view showing our improved fish line sinker and anchor attached to a fish line and in use on the bottom of a body of water.

Referring to the drawing by reference characters, we have shown our invention as embodied in a combination fish line sinker and anchor as indicated generally at 10, and including a body 11 and a shank 12. The body 11 may preferably be cast of lead and is substantially V-shaped in cross section and includes planar sloping sides 13 and 14 and top surface 15. The ends consist of obtusely arranged faces 16 and 17.

The top surface 15 is recessed as at 18, with the recessed ends having sloping, obtusely arranged faces 19 and 20. A hole 21 may be provided through the central portion of the body 11.

The shank 12 is preferably constructed from wire and has a sharp angle intermediate bend 25. The shank is disposed as shown in Fig. 6 in the median plane of the body 11. The lower terminal ends of the shank may be bent inwardly as at 26 so that the hasp may be placed in the mold when a sinker is cast, thus being secured in the position shown.

In operation, referring primarily to Fig. 6, when the sinker is fastened to a line L by means of a suitable coupling fastener F, it will rest on the bottom on elongated broad sides 13 and 14 and thus much tumbling due to water currents will be avoided. When the line L is pulled slightly, the sinker will move to the position shown by the dotted lines of Fig. 6, thus digging in and anchoring the fishing line in a relatively stable position.

Having thus described our invention and the present preferred embodiments thereof, we desire to emphasize the fact that many modifications may be resorted to in a manner limited only by a just interpretation of the following claim.

Having thus described our invention, we claim:

A fishline sinker comprising a body and a shank, said body having planar converging sides and having a top portion comprising planar end portions with a recess between said end portions, the body at the base between the recess being planar and perpendicular to the median plane of the sides, the walls of the body at each end of the recess being planar and converging towards said median plane, the end faces of the body comprising planar portions converging towards said median plane, the shank including end portions bent inwardly and disposed in the end portions of the body, said shank having an elongated securing loop integral with the end portions of the shank and projecting beyond the top end portion of the body and having an intermediate attaching portion located above the recess and the top portion of the body, said attaching portion being located in the median plane of said body, and said body having a transverse hole therethrough intermediate the length thereof.

AMBROSE NEJA.
LAWRENCE WEBER.

REFERENCES CITED

The following references are of record in the file of this patent:

UNITED STATES PATENTS

| Number | Name | Date |
|---|---|---|
| 2,033,683 | Clark | Mar. 10, 1936 |
| 2,170,067 | Stephen | Aug. 22, 1939 |
| 2,237,540 | Asprer | Apr. 8, 1941 |